(12) United States Patent
Shrivastava et al.

(10) Patent No.: US 10,906,374 B2
(45) Date of Patent: Feb. 2, 2021

(54) A/C COMPRESSOR CONTROL USING REFRIGERANT PRESSURE

(71) Applicant: FORD GLOBAL TECHNOLOGIES, LLC, Dearborn, MI (US)

(72) Inventors: Rohan Shrivastava, Livonia, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 16/207,574

(22) Filed: Dec. 3, 2018

(65) Prior Publication Data

US 2020/0171916 A1 Jun. 4, 2020

(51) Int. Cl.
*B60H 1/32* (2006.01)
*B60H 1/00* (2006.01)

(52) U.S. Cl.
CPC ..... *B60H 1/00807* (2013.01); *B60H 1/00792* (2013.01); *B60H 1/3208* (2013.01); *B60H 2001/003* (2013.01); *B60H 2001/00307* (2013.01); *B60H 2001/327* (2013.01); *B60H 2001/3255* (2013.01)

(58) Field of Classification Search
CPC .............. B60H 1/00807; B60H 1/00978
See application file for complete search history.

(56) References Cited

U.S. PATENT DOCUMENTS

| | | | | |
|---|---|---|---|---|
| 4,286,438 A * | 9/1981 | Clarke | ..... | F25B 41/04 62/216 |
| 4,660,386 A * | 4/1987 | Hansen | ..... | F25B 49/005 62/126 |
| 4,679,404 A * | 7/1987 | Alsenz | ..... | F25B 49/022 236/78 D |
| 4,765,150 A * | 8/1988 | Persem | ..... | F04B 49/065 417/45 |
| 4,794,762 A * | 1/1989 | Orth | ..... | B60H 1/3211 62/184 |
| RE33,620 E * | 6/1991 | Persem | ..... | F04B 49/065 417/45 |
| 5,167,127 A * | 12/1992 | Ohtsu | ..... | B60H 1/3225 62/133 |
| 5,253,483 A * | 10/1993 | Powell | ..... | B60H 1/3211 62/181 |
| 5,255,529 A * | 10/1993 | Powell | ..... | B60H 1/3205 62/180 |
| 5,257,508 A * | 11/1993 | Powell | ..... | B60H 1/3205 62/180 |
| 5,275,009 A * | 1/1994 | Kobayashi | ..... | B60H 1/3225 62/129 |
| 5,307,644 A * | 5/1994 | Cummins | ..... | B60H 1/00828 123/41.12 |

(Continued)

FOREIGN PATENT DOCUMENTS

DE 102007012240 A1 9/2008

*Primary Examiner* — Nelson J Nieves

(74) *Attorney, Agent, or Firm* — David B Kelley; Brooks Kushman PC

(57) ABSTRACT

A system for a vehicle includes an air conditioning compressor, and a controller configured to operate the compressor based on temperature value, responsive to the temperature values being faulty and refrigerant pressure values exceeding a first threshold, operate the compressor based on the refrigerant pressure values, and responsive to the refrigerant pressure values falling below a second threshold, deactivate the compressor for a rest of a drive cycle.

17 Claims, 3 Drawing Sheets

(56) References Cited

U.S. PATENT DOCUMENTS

| | | | | |
|---|---|---|---|---|
| 5,396,779 A * | 3/1995 | Voss | B60H 1/00792 | 62/196.2 |
| 6,148,632 A * | 11/2000 | Kishita | B60H 1/00914 | 62/196.4 |
| 6,348,868 B1 * | 2/2002 | Chou | F25B 49/005 | 340/506 |
| 6,357,241 B1 * | 3/2002 | Dudley | F25B 41/043 | 62/126 |
| 6,920,386 B2 | 7/2005 | Super et al. | | |
| 8,151,585 B2 | 4/2012 | Douglas et al. | | |
| 2004/0123613 A1 * | 7/2004 | Chiang | A47F 3/0443 | 62/246 |
| 2005/0193747 A1 * | 9/2005 | Kajimoto | B60H 1/322 | 62/133 |
| 2006/0168977 A1 * | 8/2006 | Tille | G01D 3/08 | 62/208 |
| 2009/0084120 A1 * | 4/2009 | Meier | F25B 49/022 | 62/129 |
| 2010/0326127 A1 * | 12/2010 | Oomura | F25B 41/04 | 62/498 |
| 2011/0197607 A1 * | 8/2011 | Tanaka | F25B 13/00 | 62/180 |
| 2012/0291984 A1 * | 11/2012 | Li | F24F 11/77 | 165/11.1 |
| 2014/0208785 A1 * | 7/2014 | Wallace | F25B 49/02 | 62/115 |
| 2015/0107282 A1 * | 4/2015 | Izadi-Zamanabad | F25B 41/062 | 62/115 |
| 2015/0121917 A1 * | 5/2015 | Lee | F24B 49/005 | 62/115 |
| 2015/0165870 A1 * | 6/2015 | Kim | B60H 1/00978 | 701/36 |
| 2015/0330651 A1 * | 11/2015 | Goel | F25B 49/022 | 700/276 |
| 2016/0200169 A1 * | 7/2016 | Tjahjono | B60H 1/00778 | 701/45 |
| 2017/0219253 A1 * | 8/2017 | Vaisman | F25B 41/00 | |
| 2017/0341486 A1 * | 11/2017 | Petrak | F04D 25/06 | |
| 2019/0011156 A1 * | 1/2019 | Izadi-Zamanabadi | F25B 41/062 | |
| 2019/0353370 A1 * | 11/2019 | Hern | F24F 11/89 | |

* cited by examiner

A/C COMPRESSOR CONTROL USING REFRIGERANT PRESSURE

TECHNICAL FIELD

The present disclosure relates to systems and methods for controlling an A/C compressor based on refrigerant pressure and inferred ambient air temperature.

BACKGROUND

The term "electric vehicle" may be used to describe vehicles having at least one electric motor for vehicle propulsion, such as battery electric vehicles (BEV), hybrid electric vehicles (HEV), and plug-in hybrid electric vehicles (PHEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A system for a vehicle includes an air conditioning compressor, and a controller configured to operate the compressor based on temperature value, responsive to the temperature values being faulty and refrigerant pressure values exceeding a first threshold, operate the compressor based on the refrigerant pressure values, and responsive to the refrigerant pressure values falling below a second threshold, deactivate the compressor for a rest of a drive cycle.

A method for a vehicle includes operating, by a controller, an air conditioning compressor based on temperature value, responsive to the temperature values being faulty and refrigerant pressure values exceeding a first threshold, operating the compressor based on the refrigerant pressure values, and responsive to the refrigerant pressure values falling below a second threshold, deactivating the compressor for a rest of a drive cycle.

A system for a vehicle includes an air conditioning compressor, and a controller configured to, responsive to temperature values being valid, operate the compressor based thereupon, and, otherwise, operate the compressor based on refrigerant pressure values responsive to refrigerant pressure values exceeding a first threshold prior to activation of the compressor and exceeding a second threshold following the activation.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electrical air conditioning (eAC) system may be configured to perform both cabin and traction battery cooling. The eAC system may operate based on signals from sensors that measure voltage, current, temperature, and other parameters interior and exterior to the vehicle. Among others, the eAC system may use signals of an ambient air temperature sensor to cool a traction battery and cabin interior. The ambient air temperature may be disposed about an exterior portion of the vehicle, such as proximate to a side mirror or a front grill, and may be configured to detect temperature of air flowing thereacross. In absence of a valid signal from the ambient air temperature sensor, the eAC system may be configured to cool vehicle cabin and traction battery based on one or more signals from other sensors, such as, but not limited to, an intake air manifold temperature sensor. Additionally or alternatively, when a valid signal from the ambient air temperature sensor is unavailable, the eAC system may cool the cabin and traction battery based on a predefined (default) ambient air temperature value. In some instances, the default ambient air temperature values may cause a component of the eAC system, such as an air conditioning compressor, to operate incorrectly or to shut down entirely.

In some instances, risks of damaging the compressor during the ambient air temperature sensor malfunction may be minimized by operating the compressor according to a high side pressure of the refrigerant system. A controller of the vehicle may receive one or more signals from an A/C refrigerant pressure sensor. In one example, since the saturation temperature of the refrigerant dependent on a refrigerant pressure, the refrigerant pressure may be a reliable indicator of an actual ambient air temperature.

Figure 1:
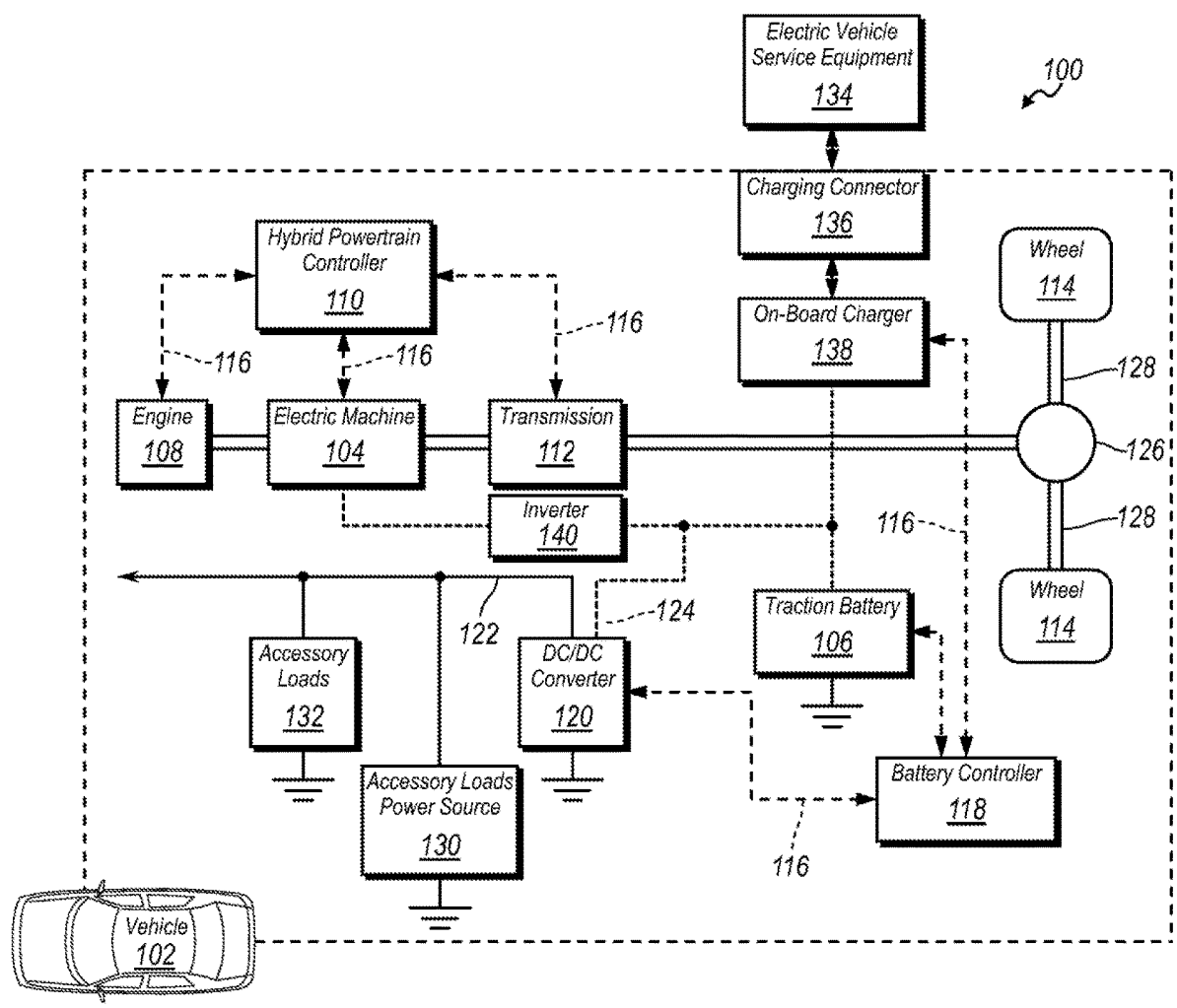
FIG. 1 is a block diagram of a plug-in hybrid electric vehicle (PHEV) illustrating a typical drivetrain and energy storage components.

FIG. 1 illustrates an example diagram of a system. 100 of a hybrid electric vehicle (hereinafter, vehicle) 102 capable of receiving electric charge. The vehicle 102 may be of various types of passenger vehicles, such as crossover utility vehicle (CUV), sport utility vehicle (SUV), truck, recreational vehicle (RV), boat, plane or other mobile machine for transporting people or goods. It should be noted that the illustrated system 100 is merely an example, and more, fewer, and/or differently located elements may be used.

The vehicle 102 includes at least one electric machine 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102. The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. The traction battery 106 may comprise a plurality of battery cells, e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor. While the traction battery 106 is described as including electrochemical cells, other types of energy storage device implementations, such as capacitors, are also contemplated.

A battery controller 118 may be configured to monitor and control operation of the traction battery 106. In one example, the battery controller 118 configured to control the plurality of connectors and switches, e.g., contactors, of the traction battery 106 to active and deactivate a transfer of energy to and from the battery 106. The battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command contactors to open or close in response to receiving a signal from the other vehicle controllers. Additionally or alternatively, the battery controller 118 may be in communication with the hybrid powertrain controller 110 and may command to charge and discharge the traction battery 106 responsive to a corresponding signal from the hybrid powertrain controller 110. The powertrain controller 110, the battery controller 118, and other vehicle controllers may communicate with one another and with other components of the vehicle 102 via at least one in-vehicle network, such as, but not limited to, a vehicle controller area network (CAN), an Ethernet network, and a media-oriented system transfer (MOST), as some examples.

Each of the hybrid powertrain controller 110, the battery controller 118 and other vehicle 102 controllers, may include a processor connected with both a memory and a computer-readable storage medium of that controller and configured to perform instructions, commands, and other routines in support of the processes described herein. For instance, the processor of each corresponding controller may be configured to execute instructions of vehicle applications to provide features such as battery cooling, cabin conditioning preferences during regular vehicle 102 operation and/or during or immediately following traction battery 106 charging, among other examples. Such instructions and other data may be maintained in a non-volatile manner using a variety of types of computer-readable storage medium. The computer-readable medium (also referred to as a processor-readable medium or storage) includes any non-transitory (e.g., tangible) medium that participates in providing instructions or other data that may be read by the processor of the corresponding vehicle 102 controller. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Figure 2:
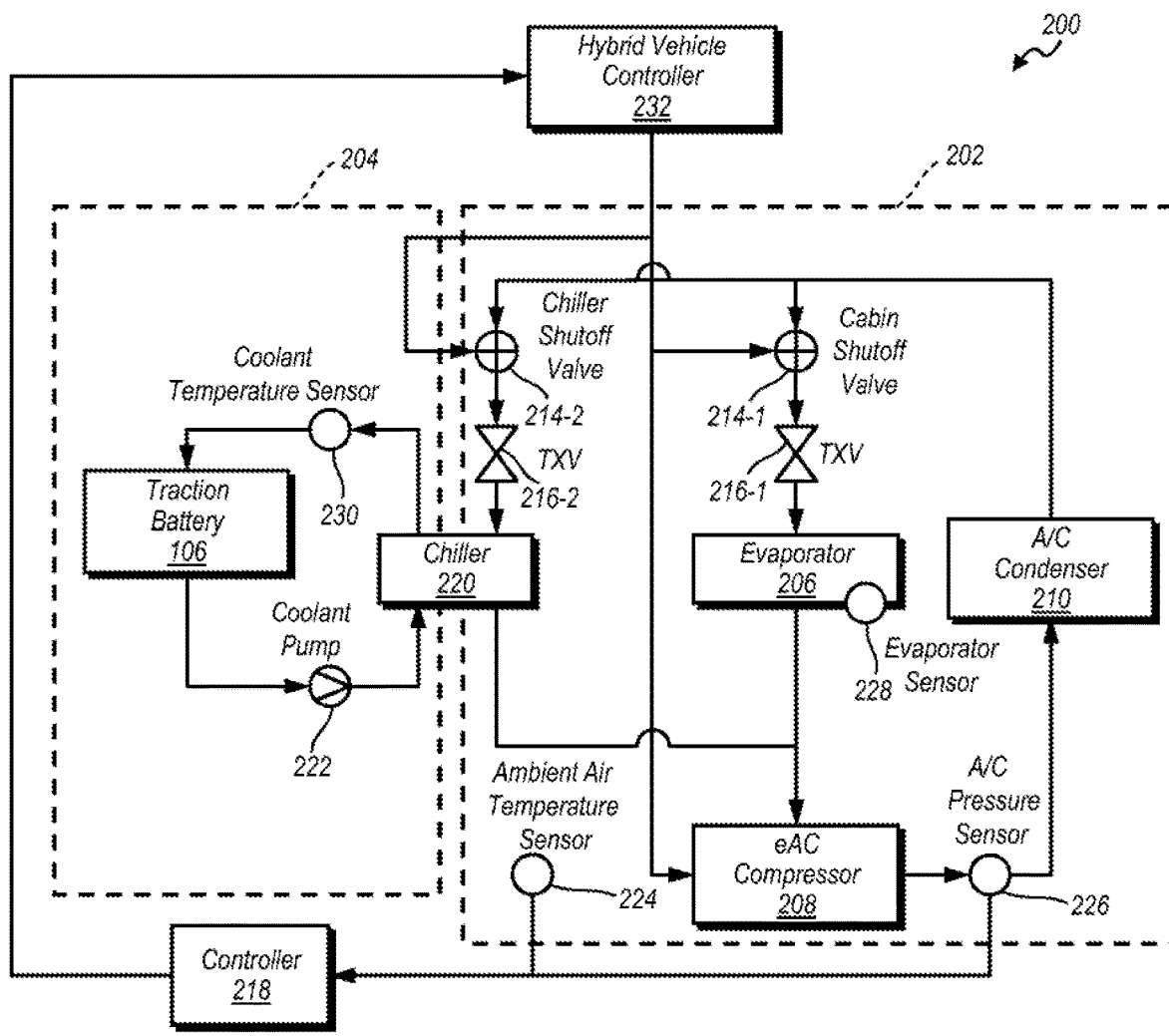
FIG. 2 is a block diagram illustrating cabin and component cooling loops of the PHEV.

As described in reference to at least FIG. 2, the controllers of the vehicle 102 may be further configured to receive signals from a plurality of vehicle 102 sensors, such as, but not limited to, battery voltage sensor, battery current sensor, battery temperature sensor, ambient air temperature sensor, coolant temperature sensor, air conditioning refrigerant temperature sensor, evaporator temperature sensor, and so on. The controllers of the vehicle 102 may cool or heat the traction battery 106, provide cabin conditioning and activate other operations responsive to receiving a signal from the one or more vehicle sensors.

The traction battery 106 is electrically connected (illustrated generally as a dotted line) 124 to the electric machine 104, such that energy stored in the traction battery 106 can be used and/or replenished by the electric machine 104. The connection 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106.

In addition to providing energy for propulsion, the traction battery 106 may provide energy for high voltage loads, such as an electric air conditioning (eAC) system and positive temperature coefficient (PTC) heater, and low voltage loads, such as electrical accessories, an auxiliary 12-V battery, and so on. Temperature of the traction battery 106, the charging system, and other subsystems of the vehicle 102 may increase during regular vehicle operation or during traction battery charging. Cabin conditioning may be further provided during regular vehicle operation and/or during energy transfer to charge the traction battery 106. In some instances, the cooling and conditioning components may be powered by on-vehicle energy sources, such as, but not limited to, the traction battery 106, the auxiliary low voltage battery and so on.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition oil and/or engine off states.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200A DC charging, Level 3 200-450V and up to 400A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, the Chinese GRIT 27930, GRIT 18487.1, GB/T 20234.1, GBT 20234.2, GB/T 20234.3 and so on. In one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a threshold duty cycle.

FIG. 2 illustrates an example thermal management system 200. The system 200 may include a cabin cooling loop 202 configured to regulate interior cabin climate of the vehicle 102 and a component cooling loop 204 that performs thermal management of the traction battery 106, one or more subcomponents of the traction battery 106, and/or one or more components related to charging and discharging the traction battery 106. In one example, each loop 202, 204 may circulate one or several liquid or gaseous substances. The substance or a mixture of substances may undergo one or more physical or chemical state changes that may, among other effects, assist in transferring energy or heat from one portion of a given loop or another portion of that loop.

In some instances, the cabin and component cooling loops 202, 204 may be physically or chemically isolated from one another, such that matter circulated in the cabin cooling loop 202 does not interact with matter circulated in the component cooling loop 204. In some other instances, the cabin and component cooling loops 202, 204 may be joined together (interlinked) or include one or more common (or shared) components, such that the corresponding substances being circulated may wholly or partially mix with one another. In still other instances, each of the corresponding substances of the cabin and component cooling loops 202, 204 may enter and exit a given shared component at different times from one another, such that no mixing occurs.

In one example, the cabin cooling loop 202 may include an evaporator core 206, an electrical air conditioning (eAC) compressor 208, a condenser 210, a shutoff valve 214-1, and a thermal expansion valve 216-1. The evaporator core 206, alone or in combination with other components, such as, but not limited to, a heater core, a blower motor, and so on, may comprise a heating ventilation and air conditioning (HVAC) assembly. Moreover, each of the evaporator core 206, the eAC compressor 208, the condenser 210, and so on may be connected to corresponding ducts, vents, and air flow passages configured to deliver, withdraw, and circulate air to make climate control adjustments or to maintain or establish climate control settings.

In some examples, a controller 218 may be electrically connected to in-vehicle HVAC user controls, a plurality of sensors, e.g., an ambient air temperature sensor 224, an air conditioning pressure sensor 226, a humidity sensor, a sun load sensor, and so on, and one or more duct doors or duct door actuators. The controller 218 may be configured to monitor and control operation of the climate control system based on signals from the sensors and the user controls. As one example, the controller 218, responsive to a request from a given user control, may be configured to operate an actuator to move a duct door connected thereto to a predefined duct door position consistent with the request. As another example, a hybrid vehicle controller 232 may control operation of the interior climate control system, e.g., by operating an actuator to move a duct door connected thereto to a predefined duct door position, based on a signal from the controller 218, the battery controller 118, the charger 134, and so on.

The eAC compressor 208 may be configured to compress vapor output by the evaporator 206 and transfer the compressed vapor to the condenser 210. The hybrid vehicle controller 232 may be configured to monitor and control operation of the shutoff valves 214-1 and 214-2. In one example, the hybrid vehicle controller 232 may be configured to selectively open and close at least one of the shutoff valves 214-1 and 214-2, such that condensate output by the condenser 210 may be transferred to a corresponding one of the thermal expansion valves 216-1 and 216-2. Output of the first thermal expansion valve 216-1 may be directed to the evaporator 206 and output of the second thermal expansion valve 216-2 may be directed to a chiller 220.

The chiller 220 may include a plate heat exchanger and may be configured to absorb heat from the refrigerant output by the second thermal expansion valve 216-2 and transfer the cooled refrigerant to the eAC compressor 208. Thus, in some examples, the chiller 220 may be configured to supplement thermal management of the vehicle 102 cabin interior. In some instances, the chiller 220 may receive output of a proportional valve transferring coolant (and, thereby, transferring heat absorbed by the coolant) away from a battery cold plate to cool the traction battery 106. In still other examples, the refrigerant circulating in the cabin cooling loop 202 and the coolant of the component cooling loop 204, when passing through the chiller 220, may exchange heat with one another, such that, but not limited to, the refrigerant may be used to cool the traction battery 106 and the coolant may be used to cool cabin interior.

A pump 222 of the component cooling loop 204 may be connected at the output of the chiller 220 and may be configured to direct coolant to the traction battery 106. The hybrid vehicle controller 232 may be configured to monitor and control operation of the pump 222. In one example, the hybrid vehicle controller 232 may selectively activate the pump 222, responsive to cabin temperature and/or the traction battery temperature being greater than a corresponding temperature threshold, and may deactivate the pump 222 responsive to one or both temperatures being less than the corresponding temperature thresholds. In some instances, the hybrid vehicle controller 232 may be configured to activate and deactivate the pump 222 based on signals from a coolant temperature sensor 230 disposed at an input to the traction battery 106. As another example, the hybrid vehicle controller 232 may control operation of the pump 222 based on a signal from the controller 218, the battery controller 118, the charger 138, and so on.

The air conditioning pressure sensor 226 may be a refrigerant pressure sensor configured to deactivate the eAC compressor 208 responsive to the pressure being greater than a maximum pressure for operating the eAC compressor 208. The pressure threshold may be based on a type of refrigerant used by the eAC compressor 208, heater pump, or another component of the system. In some instances, risks of damaging the eAC compressor 208 during the ambient air temperature sensor 224 malfunction may be minimized by operating the eAC compressor 208 according to a high side pressure values received from the sensor 226. The refrigerant pressure may be a reliable indicator to continue to run an eAC compressor in the absence of an actual ambient air temperature since the saturation temperature of the refrigerant dependents on a refrigerant pressure.

In some instances, the controller 218 may be configured to detect a quality factor corresponding to output received from the ambient air temperature sensor 224. In one example, a quality factor value of 0x0 may be indicative of the output of the sensor 224 being "faulty," a quality factor value of 0x1 may be indicative of the output of the sensor 224 being "acceptable," a quality factor value of 0x2 may be indicative of the output of the sensor 224 being "degraded," and a quality factor value of 0x3 may be indicative of the output of the sensor 224 being "not within specification." Responsive to the quality factor value indicating that the output of the sensor 224 is "faulty," or "not within specification," the controller 218 may be configured to run the eAC compressor 208 according to a high side pressure values received from the sensor 226. In some instances, "degraded" signal quality be acceptable for operating the eAC compressor 208, ambient air temperature may be inferred from an intake air temperature sensor.

For instance, the controller 218 may be configured to compare the detected high side refrigerant pressure value to a first threshold prior to activating the eAC compressor. The first threshold may be based on a minimum pressure threshold for activating the eAC compressor 208 and may be defined according to materials, techniques, and methodologies applied during compressor design, manufacturing, assembly, and other stages of component production and distribution. In some instances, the first threshold may be 2.5 bar. In some other instances, the first threshold may include values less than or greater than 2.5 bar. In still other examples, the controller 218 may be configured to determine a difference between the first threshold and the minimum pressure threshold for activating the eAC compressor 208. The controller 218 may be configured to operate the eAC compressor 208 based on the refrigerant pressure values responsive to the difference between the first threshold and the minimum pressure threshold being greater than or less than a difference threshold, e.g., greater than or less than 1 bar and so on.

In response to the detected refrigerant pressure values being greater than the first threshold the controller 218 may activate the eAC compressor 208. Operating the eAC compressor 208 according to a high side pressure values received from the sensor 226 may minimize risks of damaging the eAC compressor 208 during the ambient air temperature sensor 224 malfunction, since the saturation temperature of the refrigerant is dependent on a refrigerant pressure, thereby, making the refrigerant pressure a reliable indicator of an ambient air temperature. Additionally or alternatively, the controller 218 may be configured to disable the eAC compressor 208 for a rest of a drive cycle responsive to the detected refrigerant pressure values falling below the first threshold.

In some other examples, the controller 218 may be configured to determine whether a high side refrigerant pressure value, detected following activation of the eAC compressor 208, exceeds a second threshold, where the second threshold may be greater than the first threshold. As one example, the second threshold may be refrigerant pressure values indicative of a minimum load for continuous operation of the eAC compressor 208.

In response to the refrigerant pressure values, detected following the activation of the compressor, exceeding the second threshold, the controller 218 may continue operating the eAC compressor 208 based on the high side refrigerant pressure values. Additionally or alternatively, the controller 218 may be configured to deactivate the eAC compressor 208 responsive to the high side refrigerant pressure values, detected following the activation of the eAC compressor 208, falling below the second threshold.

Figure 3:
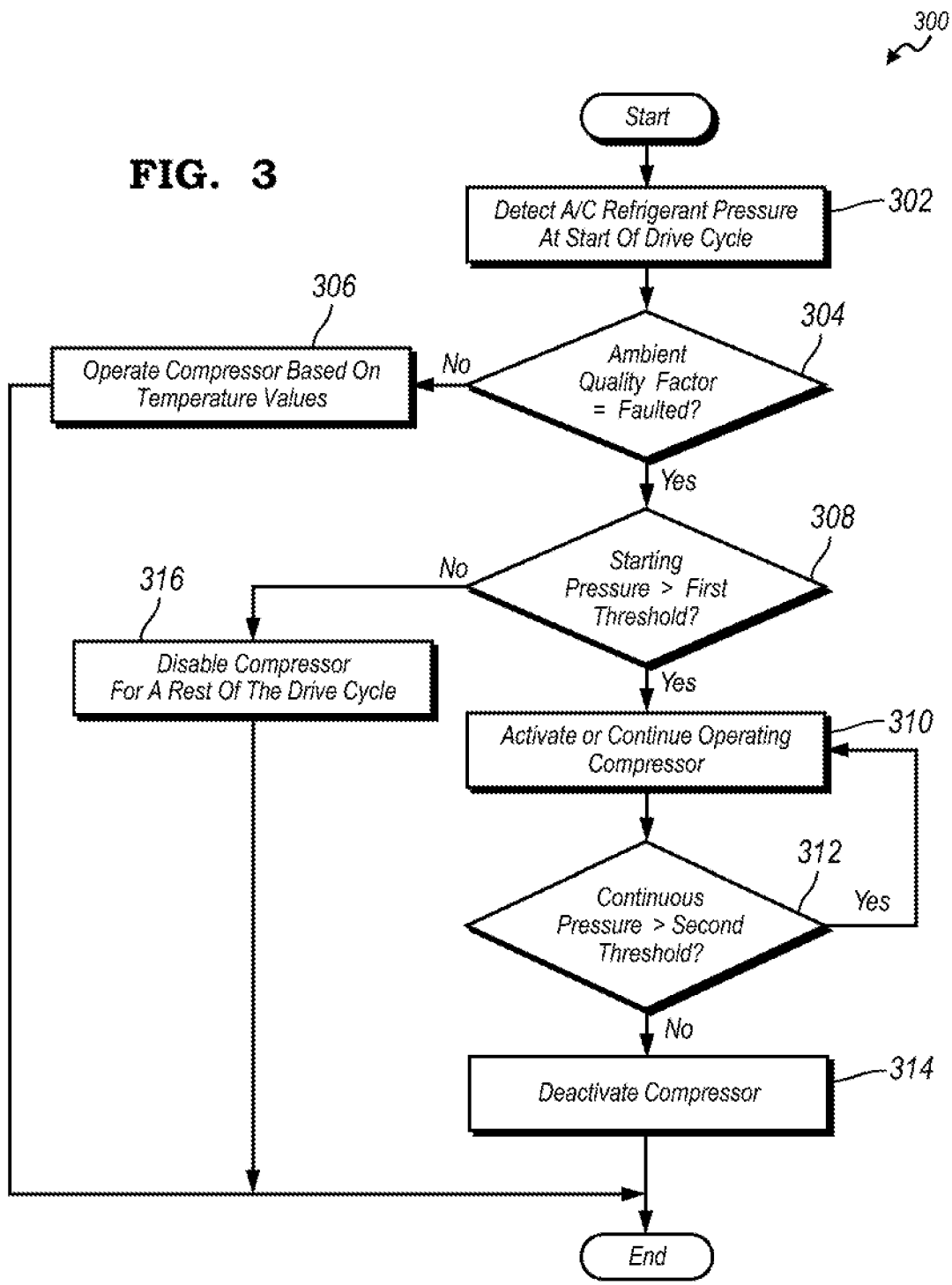
FIG. 3 is a flowchart illustrating an algorithm for inferring ambient temperature based on a high side refrigerant pressure.

FIG. 3 illustrates an example process 300 for controlling an A/C compressor based on refrigerant pressure. The process 300 may begin at block 302 where the controller 218 detects an air conditioning refrigerant pressure value responsive to the vehicle 102 being turned on, i.e., at a beginning or start of a drive cycle. In some instances, the controller 218 may receive a signal from a high-side pressure refrigerant sensor 226 upon the vehicle 102 being keyed ON. At block 304 the controller 218 may determine whether a quality factor corresponding to an output signal of the ambient air temperature sensor 224 is "acceptable." The controller 218 may proceed to block 306 and operate the eAC compressor 208 based on ambient air temperature values received from the sensor 224 responsive to the quality factor value of the output signal of the ambient air temperature sensor 224 being "acceptable" or "degraded." The controller 218 may then exit the process 300.

Responsive to the quality factor value indicating that the output signal of the sensor 224 is one of "faulty," or "not within specification," the controller 218 may be configured to run the eAC compressor 208 according to a high side pressure values received from the sensor 226. For example, at block 308, the controller 218 may be configured to compare the detected high side refrigerant pressure value to a first threshold. The first threshold may be based on a minimum pressure threshold for activating the eAC compressor 208 and may be defined according to materials, techniques, and methodologies applied during compressor design, manufacturing, assembly, and other stages of component production and distribution. In some instances, the first threshold may be 2.5 bar. In some other instances, the first threshold may include values less than or greater than 2.5 bar. In still other examples, the controller 218 may be configured to determine a difference between the first threshold and the minimum pressure threshold for activating the eAC compressor 208. The controller 218 may be configured to operate the eAC compressor 208 based on the refrigerant pressure values responsive to the difference between the first threshold and the minimum pressure threshold being greater than or less than a difference threshold, e.g., greater than or less than 1 bar and so on.

At block 316, the controller 218 may disable the eAC compressor 208 for a rest of the drive cycle responsive to the detected refrigerant pressure values falling below the first threshold. The controller 218 may then exit the process 300.

In response to the detected refrigerant pressure value being greater than the first threshold the controller 218, at block 310, may activate the eAC compressor 208. Operating the eAC compressor 208 according to a high side pressure values received from the sensor 226 may minimize risks of damaging the eAC compressor 208 during the ambient air temperature sensor 224 malfunction, since the saturation temperature of the refrigerant is dependent on a refrigerant pressure, thereby, making the refrigerant pressure a reliable indicator for continuing operating the eAC compressor 208.

At block. 312, the controller 218 may be configured to determine whether a high side refrigerant pressure value, detected following activation of the eAC compressor 208, exceeds a second threshold. In some instances, the second threshold may be greater than the first threshold. In some other examples, the second threshold may be one or more pressure values indicative of a minimum load for continuous operation of the eAC compressor 208.

In response to the refrigerant pressure values, detected following the activation of the compressor, exceeding the second threshold, the controller 218 may return to block 310 and continue operating the eAC compressor 208 based on the high side refrigerant pressure values. The controller 218 may, at block 314, deactivate the eAC compressor 208 responsive to the detected high side refrigerant pressure value falling below a second threshold. The controller 218 may then exit the process 300.

The process 300 may then end. In some instances, the process 300 may be repeated responsive to a signal indicating that the vehicle 102 has been keyed ON or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
an air conditioning compressor; and
a controller configured to
operate the compressor based on temperature values,
responsive to the temperature values being faulty and refrigerant pressure values exceeding a first threshold, operate the compressor based on the refrigerant pressure values, and
responsive to the refrigerant pressure values falling below a second threshold, deactivate the compressor for a rest of a drive cycle, wherein the second threshold is greater than the first threshold.

2. The system of claim 1, wherein the controller is further configured to, responsive to the refrigerant pressure values exceeding the second threshold, continuing to operate the compressor based on the refrigerant pressure values.

3. The system of claim 1, wherein the temperature values are detected using an ambient air temperature sensor and the refrigerant pressure values are detected using an air conditioning pressure sensor.

4. The system of claim 3, wherein the pressure sensor is a high side refrigerant pressure sensor disposed at an output of the compressor.

5. The system of claim 1, wherein the first threshold is greater than a minimum pressure value to activate the compressor.

6. The system of claim 5, wherein a difference between the first threshold and the minimum pressure value is between 1 and 2 bar.

7. A method for a vehicle comprising:
operating, by a controller, an air conditioning compressor based on temperature values,
responsive to the temperature values being faulty and refrigerant pressure values exceeding a first threshold, operating the compressor based on the refrigerant pressure values, and
responsive to the refrigerant pressure values falling below a second threshold, deactivating the compressor for a rest of a drive cycle, wherein the second threshold is greater than the first threshold.

8. The method of claim 7 further comprising, responsive to the refrigerant pressure values exceeding the second threshold, continuing to operate the compressor based on the refrigerant pressure values.

9. The method of claim 7, wherein the temperature values are detected using an ambient air temperature sensor and the refrigerant pressure values are detected using an air conditioning pressure sensor.

10. The method of claim 9, wherein the pressure sensor is a high side refrigerant pressure sensor disposed at an output of the compressor.

11. The method of claim 7, wherein the first threshold is greater than a minimum pressure value to activate the compressor.

12. The method of claim 11, wherein a difference between the first threshold and the minimum pressure value is between 1 and 2 bar.

13. A system for a vehicle comprising:
an air conditioning compressor; and
a controller configured to, responsive to temperature values being valid, operate the compressor based thereupon, and,
otherwise, operate the compressor based on refrigerant pressure values responsive to the refrigerant pressure values exceeding a first threshold prior to activation of the compressor and exceeding a second threshold following the activation, wherein the second threshold is greater than the first threshold.

14. The system of claim 13, wherein the controller is further configured to deactivate the compressor responsive to the refrigerant pressure values falling below the second threshold.

15. The system of claim 13, wherein the controller is further configured to disable the compressor for a rest of a drive cycle responsive to the refrigerant pressure values falling below the first threshold.

16. The system of claim 13, wherein the temperature values are detected using an ambient air temperature sensor and the refrigerant pressure values are detected using an air conditioning pressure sensor.

17. The system of claim 16, wherein the pressure sensor is a high side refrigerant pressure sensor disposed at an output of the compressor.

\* \* \* \* \*